(12) United States Patent
Kim et al.

(10) Patent No.: US 12,407,928 B2
(45) Date of Patent: Sep. 2, 2025

(54) SENSOR ACTUATOR WITH LENGTH-ADJUSTABLE WIRES AND CAMERA MODULE INCLUDING THE SAME

(71) Applicant: SAMSUNG ELECTRO-MECHANICS CO., LTD., Suwon-si (KR)

(72) Inventors: Ju Ho Kim, Suwon-si (KR); Sang Hyun Ji, Suwon-si (KR); Jung Hyun Park, Suwon-si (KR); Doo Seub Shin, Suwon-si (KR); Dong Hoon Lee, Suwon-si (KR); Do Hwan Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 190 days.

(21) Appl. No.: 18/084,734

(22) Filed: Dec. 20, 2022

(65) Prior Publication Data

US 2023/0224588 A1 Jul. 13, 2023

(30) Foreign Application Priority Data

Jan. 7, 2022 (KR) .................. 10-2022-0002965

(51) Int. Cl.
*H04N 23/68* (2023.01)
*F03G 7/06* (2006.01)
*H04N 23/67* (2023.01)

(52) U.S. Cl.
CPC ....... *H04N 23/687* (2023.01); *F03G 7/06143* (2021.08); *F03G 7/064* (2021.08); *H04N 23/67* (2023.01); *H04N 23/6812* (2023.01)

(58) Field of Classification Search
CPC .. H04N 23/687; H04N 23/67; H04N 23/6812; H04N 23/54; H04N 23/57;
(Continued)

(56) References Cited

U.S. PATENT DOCUMENTS 9,518,566 B2 12/2016 Eddington et al.
2010/0209323 A1* 8/2010 Augustine ............ B01J 23/8892
423/239.1
(Continued)

FOREIGN PATENT DOCUMENTS

JP 2020-95136 A 6/2020
KR 10-1609351 B1 4/2016
(Continued)

OTHER PUBLICATIONS

Korean Office Action issued on Jun. 23, 2023, in counterpart Korean Patent Application No. 10-2022-0002965 (6 pages in English, 5 pages in Korean).
(Continued)

*Primary Examiner* — Gevell V Selby
(74) *Attorney, Agent, or Firm* — NSIP Law

(57) ABSTRACT

A sensor actuator is provided. The sensor actuator includes a movable body on which an image sensor having an imaging plane is disposed; a fixed body configured to accommodate the movable body; and a driver configured to provide a driving force to move the image sensor, wherein the driver includes a wire portion having a plurality of wires of which lengths change when power is applied to the plurality of wires, wherein each of the plurality of wires is configured to have a first end coupled to the fixed body and a second end coupled to the movable body, and wherein one of the first end and the second end of each of the plurality of wires is connected to the fixed body or the movable body through an elastic portion.

18 Claims, 29 Drawing Sheets

(58) Field of Classification Search
CPC .... F03G 7/06143; F03G 7/064; F03G 7/0665; F03G 7/0636; G03B 3/00; G03B 5/00; G03B 2205/0007; G03B 2205/0046; H02K 33/18
See application file for complete search history.

(56) References Cited

U.S. PATENT DOCUMENTS

| | | | |
|---|---|---|---|
| 2011/0169920 A1* | 7/2011 | Ryu | G03B 19/22 348/46 |
| 2011/0249131 A1* | 10/2011 | Topliss | H04N 23/68 348/208.7 |
| 2017/0315377 A1* | 11/2017 | Park | H04N 23/57 |
| 2018/0171991 A1 | 6/2018 | Miller et al. | |
| 2018/0321503 A1 | 11/2018 | Brown | |
| 2020/0174274 A1* | 6/2020 | Wang | H04N 23/687 |
| 2020/0192191 A1 | 6/2020 | Wade et al. | |
| 2021/0195073 A1* | 6/2021 | Saito | H04N 23/60 |
| 2022/0191359 A1 | 6/2022 | Oh | |

FOREIGN PATENT DOCUMENTS

| | | |
|---|---|---|
| KR | 10-2019-0097113 A | 8/2019 |
| KR | 10-2106525 B1 | 5/2020 |
| KR | 10-2020-0114251 A | 10/2020 |
| KR | 10-2168727 B1 | 10/2020 |
| WO | WO 2018/112436 A1 | 6/2018 |

OTHER PUBLICATIONS

Kazi, Arif, et al. "SMA actuator for optical image stabilization." *Actuator 2018; 16th International Conference on New Actuators.* VDE, 2018. (pp. 375-378).

"SMA OIS", Product description., HutchinsonTechnology 2017, https://www.hutchinson.tdk.com/WEbHTI/Contents/PageId/58, (4 pages in English).

* cited by examiner

SENSOR ACTUATOR WITH LENGTH-ADJUSTABLE WIRES AND CAMERA MODULE INCLUDING THE SAME

CROSS-REFERENCE TO RELATED APPLICATIONS

This application claims the benefit under 35 USC § 119(a) of Korean Patent Application No. 10-2022-0002965, filed on Jan. 7, 2022, in the Korean Intellectual Property Office, the entire disclosure of which is incorporated herein by reference for all purposes.

BACKGROUND

1. Field

The following description relates to a sensor actuator and a camera module including the same.

2. Description of Related Art

Recently, camera modules have been implemented in mobile communication terminals such as, but not limited to, smartphones, tablet personal computers (PCs), and laptops.

Additionally, camera modules may include an actuator which has a focus adjustment function or operation, and an optical image stabilization (OIS) function or operation to generate a high-resolution image.

For example, a focus may be adjusted by moving a lens module in the optical axis (Z-axis) direction, or shaking may be corrected by moving the lens module in a direction perpendicular to the optical axis (Z-axis).

However, recently, as the performance of camera modules has improved, the weight of the lens module has increased, and due to weight of a driver that moves the lens module, it may be difficult to precisely control a driving force necessary for image stabilization.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a sensor actuator includes a movable body on which an image sensor having an imaging plane is disposed; a fixed body, configured to accommodate the movable body; and a driver, configured to provide a driving force to move the image sensor, wherein the driver comprises a plurality of wires which have lengths that vary when power is applied, wherein each of the plurality of wires is configured to have a first end coupled to the fixed body and a second end coupled to the movable body, and wherein one of the first end and the second end of each of the plurality of wires is connected to the fixed body or the movable body through an elastic portion.

The fixed body may include a first support plate, and the movable body comprises a second support plate, and the elastic portion may be disposed on one of the first support plate and the second support plate.

The wire portion may include a first wire portion, a second wire portion, a third wire portion, and a fourth wire portion, wherein each of the first to fourth wire portions may include two wires, and wherein each of the first to fourth wire portions may be configured to have the first end fixed to the fixed body and the second end fixed to the movable body.

Each of the first wire portion and the second wire portion may be configured to provide a driving force to move the movable body in a first direction parallel to the imaging plane, and a moving direction of the movable body based on an operation of the first wire portion and a moving direction of the movable body based on an operation of the second wire portion are opposite to each other.

A length of one of the first wire portion and the second wire portion may be reduced when power is applied to the one of the first wire portion and the second wire portion, and wherein the elastic portion connected to wire portions other than the one of the first wire portion and the second wire portion is elastically deformed.

Each of the third wire portion and the fourth wire portion may be configured to provide a driving force to move the movable body in a second direction parallel to the imaging plane, and a moving direction of the movable body based on an operation of the third wire portion and a moving direction of the movable body based on an operation of the fourth wire portion may be opposite to each other.

A length of one of the third wire portion and the fourth wire portion may be reduced when power is applied to the one of the third wire portion and the fourth wire portion, and wherein the elastic portion connected to wire portions other than the one of the third wire portion and the fourth wire portion may be elastically deformed.

The movable body may be configured to rotate by at least two wires which are configured to generate driving forces in opposite directions.

Each of the first wire portion and the second wire portion may be configured to provide a driving force to move the movable body in a first direction parallel to the imaging plane, wherein the two wires of the first wire portion and the two wires of the second wire portion may be spaced apart from each other in a second direction parallel to the imaging plane, and wherein the first direction and the second direction are perpendicular to each other.

Each of the third wire portion and the fourth wire portion may be configured to provide a driving force to move the movable body in the second direction, respectively, and wherein the two wires of the third wire portion and the two wires of the fourth wire portion may be spaced apart from each other in the first direction.

A ball member, configured to support movement of the movable body, may be disposed between the movable body and the fixed body.

The sensor actuator may include a support substrate configured to support the movable body such that the movable body moves, wherein the support substrate comprises a deformable portion that is elastically deformed as the movable body moves.

The support substrate may further include a movable portion on which the movable body is disposed, and a fixed portion coupled to the fixed body, and the elastic portion elastically connects the movable portion to the fixed portion.

The sensor actuator may further include a position sensing portion configured to sense a position of the image sensor, and comprising a sensing coil disposed on one of the movable body and the fixed body, and a sensing yoke portion disposed on the other of the movable body and the fixed body, wherein the sensing yoke portion comprises a plurality of sensing yokes spaced apart from each other in a direction parallel to the imaging plane, and wherein each sensing yoke is configured to have a width that changes in a moving direction of the image sensor.

The plurality of sensing yokes may include a first sensing yoke and a second sensing yoke, wherein each of the first sensing yoke and the second sensing yoke opposes the sensing coil in a direction perpendicular to the imaging plane, and wherein each of the first sensing yoke and the second sensing yoke has a width that increases and decreases in a moving direction of the image sensor, and positions of the first sensing yoke and the second sensing yoke in which widths increase or decrease have different shapes.

In a general aspect, a camera module includes a lens module including at least one lens; a housing configured to accommodate the lens module; a first driver configured to move the lens module in an optical axis direction; a fixed body coupled to the housing; a movable body accommodated in the fixed body and comprising an image sensor disposed therein; a second driver configured to provide a driving force to move the image sensor in a first direction and a second direction perpendicular to the optical axis direction, wherein the second driver comprises a plurality of wires which have lengths that vary when power is applied, wherein each of the plurality of wires is configured to have a first end coupled to the fixed body and a second end coupled to the movable body, and wherein one of the first end and the second end of each wire of the plurality of wires is connected to the fixed body or the movable body through an elastic portion.

In a general aspect, an apparatus includes a camera module, including: a movable body on which an image sensor is disposed; a fixed body configured to accommodate the movable body; a driver, configured to provide a driving force to move the image sensor, the driver including: wire portions comprising first ends coupled to the fixed body and second ends coupled to the movable body, and configured to provide a driving force to move the moveable body in first and second directions parallel to an imaging plane of the image sensor, and configured to rotate the movable body about an optical axis; wherein each of the wire portions has a length that varies when power is applied.

Each of the wire portions is a shape memory alloy.

The first direction may include directions that are opposite to each other, the second direction may include directions that are opposite to each other, and the first direction is perpendicular to the second direction.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
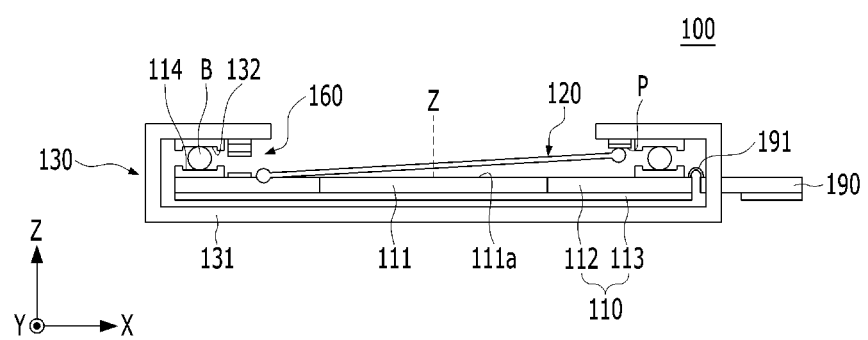
FIG. 1 is a cross-sectional diagram illustrating an example sensor actuator, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

A sensor actuator 100, in accordance with one or more embodiments, may be one of multiple components of a camera module. Additionally, the camera module may be mounted on a portable electronic device. A portable electronic device may be implemented as a portable electronic device such as a mobile communication terminal, a smartphone, or a tablet PC.

FIG. 1 is a cross-sectional diagram illustrating a sensor actuator, in accordance with one or more embodiments.

Referring to FIG. 1, the sensor actuator 100, in accordance with one or more embodiments, may include a movable body 110, a fixed body 130, and a driver 120.

The movable body 110 may include a sensor substrate 112. The movable body 110 may be disposed to move relative to the fixed body 130.

An image sensor 111 may be disposed on a first surface of the sensor substrate 112, and a reinforcing plate 113, that reinforces the rigidity of the sensor substrate 112, may be coupled to a second surface of the sensor substrate 112. Since the movable body 110 moves with the reinforcing plate 113, the sensor substrate 112 and the fixed body 130 may be prevented from being in contact with each other.

The sensor substrate 112 may be connected to the connector substrate 190 to transmit a signal of the image sensor 111 to an external entity. For example, the sensor substrate 112 and the connector substrate 190 may be electrically connected to each other by the connection portion 191. The connection portion 191 may include a plurality of bridges flexibly bent according to movement of the image sensor 111.

A signal of the image sensor 111 may be transmitted to the other electronic components through the sensor substrate 112, the connection portion 191, and the connector substrate 190.

In an example embodiment, the sensor substrate 112 may have an accommodation space to accommodate the image sensor 111. In an example, the accommodation space may have a form of a groove or a hole. The image sensor 111 may be disposed in the accommodation space and may be electrically connected to the sensor substrate 112.

The fixed body 130 of the actuator may include a housing 131. The housing 131 may have an internal space to accommodate the movable body 110.

The driver 120 may move the movable body 110.

The movable body 110 may move in a direction perpendicular to the direction in which the imaging plane 111a of the image sensor 111 is oriented based on an operation of the driver 120. In an example embodiment, the driver 120 may move the image sensor 111 to compensate for shaking that occurs when the camera modules 10 and 20 (FIGS. 20 and 21) on which the image sensor 111 is mounted perform imaging.

The driver 120 may move the movable body 110 including the image sensor 111 in a first direction (X-direction) and a second direction (Y-direction) perpendicular to the optical axis (Z-axis). The first direction (X-direction) and the second direction (Y-direction) may intersect each other. For example, the driver 120 may allow the movable body 110 to move in the first direction (X-direction) and/or the second direction (Y-direction) perpendicular to the optical axis (Z-axis), thereby correcting shaking. Additionally, the driver 120 may rotate the movable body 110 using the optical axis (Z-axis) as a rotation axis.

The driver 120 may include a wire portion of which a length may change as power is applied. The wire portion may include a plurality of wires, and each of the plurality of wires may be a shape memory alloy.

In example embodiments, the direction in which the imaging plane 111a of the image sensor 111 is oriented may be referred to as the optical axis (Z-axis) direction. That is, the movable body 110 may move in a direction perpendicular to the optical axis (Z-axis) with respect to the fixed body 130.

In the drawings, the configuration in which the movable body 110 may move in a direction parallel to the imaging plane 111a of the image sensor 111 may indicate that the movable body 110 may move in a direction perpendicular to the optical axis (Z-axis).

The configuration in which the movable body 110 may move in the first direction (X-direction) may indicate that the movable body 110 may move in a direction perpendicular to the optical axis (Z-axis).

Additionally, the first direction (X-direction) and the second direction (Y-direction) may be examples of two directions perpendicular to the optical axis (Z-axis) and intersecting each other, and in example embodiments, the first direction (X-direction) and the second direction (Y-direction) may be understood as two directions perpendicular to the optical axis (Z-axis) and intersecting each other.

In an example embodiment, the ball member B may be disposed between the fixed body 130 and the movable body 110.

The first guide groove 132 and the second guide groove 114, that accommodate at least a portion of the ball member B, may be provided in the fixed body 130 and the movable body 110, respectively. For example, the first guide groove 132 and the second guide groove 114 may be formed on a surface on which the fixed body 130 and the movable body 110 oppose each other in the optical axis (Z-axis) direction.

The ball member B may be disposed between the first guide groove 132 of the fixed body 130 and the second guide groove 114 of the movable body 110. Accordingly, when the movable body 110 moves within the fixed body 130, the movable body 110 may be guided by the ball member B such that the movable body 110 may move smoothly.

Both the first guide groove 132 and the second guide groove 114 may have a shape that does not limit a rolling direction of the ball member B. For example, the first guide groove 132 and the second guide groove 114 may have a polygonal shape or a circular shape having a size larger than the diameter of the ball member B.

In a non-limiting example, the ball member B may include at least three balls, and each of the first guide groove 132 and the second guide groove 114 may include guide grooves of which the number may correspond to the number of balls included in the ball member B.

The ball member B, the first guide groove 132 and the second guide groove 114 may guide the movable body 110 such that the movable body 110 may translate and/or rotate on the X-Y plane Referring to FIG. 1, the ball member B, and the second guide groove 114 may be disposed on the movable body 110, and the first guide groove 132 may be disposed on the fixed body 130.

Figure 2:
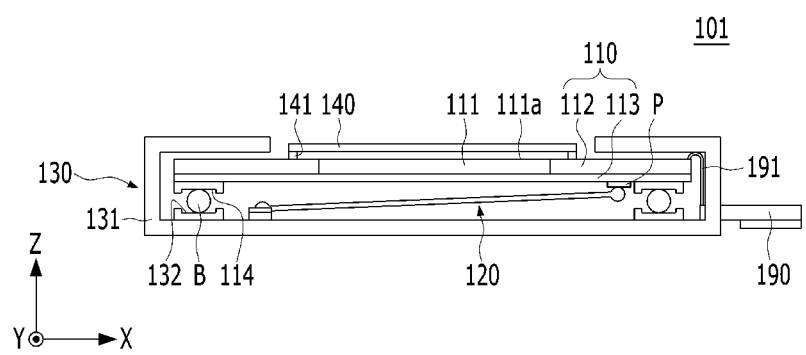
FIG. 2, FIG. 3, and FIG. 4 are cross-sectional diagrams illustrating an example sensor actuator, in accordance with one or more embodiments.
Figure 3:
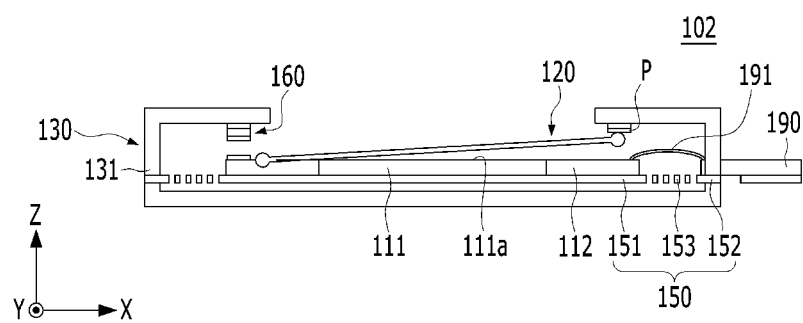
Figure 4:
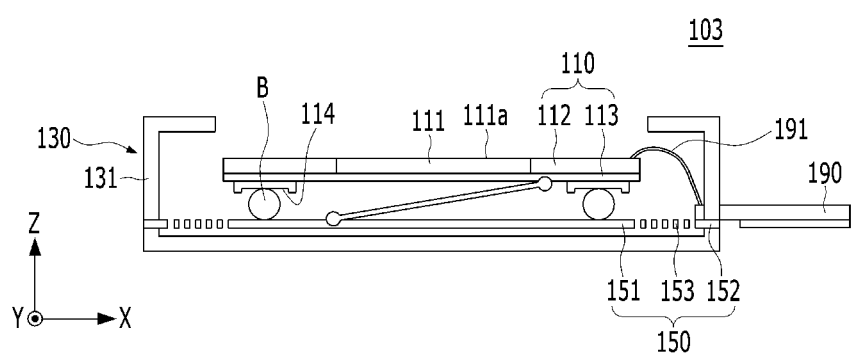

FIGS. 2 to 4 are cross-sectional diagrams illustrating a sensor actuator, in accordance with one or more embodiments.

First, referring to FIG. 2, in an example, the ball member B, the first guide groove 132 and the second guide groove 114 may be disposed below the movable body 110.

Additionally, an infrared cut-off filter 140 may be disposed in a position spaced apart from the sensor substrate 112. The infrared cut-off filter 140 may be disposed with a spacing from the sensor substrate 112 by the spacer 141. The spacers 141 may be continuously disposed along a periphery of the imaging plane 111a. The imaging plane 111a may be protected from the outside by the infrared cut-off filter 140 and the spacer 141.

Referring to FIG. 3, the movable body 110 may be coupled to the support substrate 150. For example, the support substrate 150 may support the sensor substrate 112 to move.

The support substrate 150 may include a movable portion 151 on which the sensor substrate 112 is seated and a fixed portion 152 fixed to the fixed body 130. Additionally, the support substrate 150 may include a deformable portion 153 that elastically deforms as the movable body 110 moves.

The deformable portion 153 may elastically connect the movable portion 151 to the fixed portion 152.

The movable body 110 may move together with the movable portion 151 of the support substrate 150, and as the movable body 110 moves, the deformable portion 153 may be flexibly bent.

Referring to FIG. 4, the ball member B may be disposed between the movable body 110 and the support substrate 150.

At least one of the movable body 110 and the support substrate 150 may include a guide groove 114 to accommodate at least a portion of the ball member B. For example, the guide groove 114 may be formed on one surface of the movable body 110 opposing the support substrate 150 in the optical axis (Z-axis) direction.

In an example, the guide groove 114 may be formed in the movable body 110 in FIG. 4. However, this is merely an example, and the guide groove may also be formed in the support substrate 150.

Figure 5:
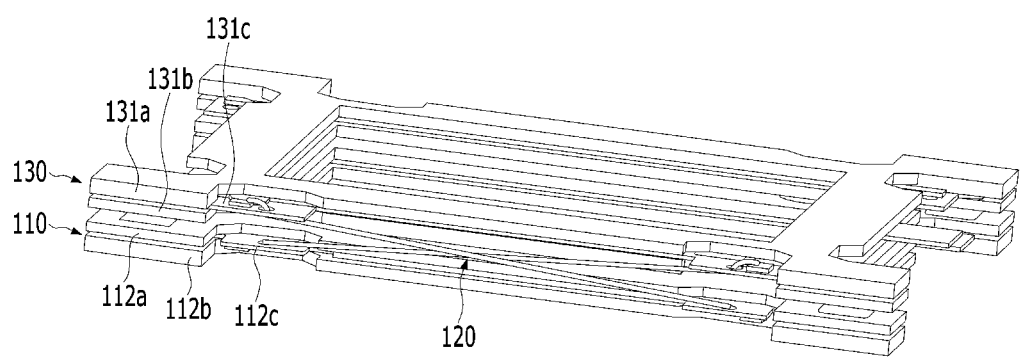
FIG. 5 is a perspective diagram illustrating an example in which a driver is connected to a fixed body and a movable body, in accordance with one or more embodiments.
Figure 6:
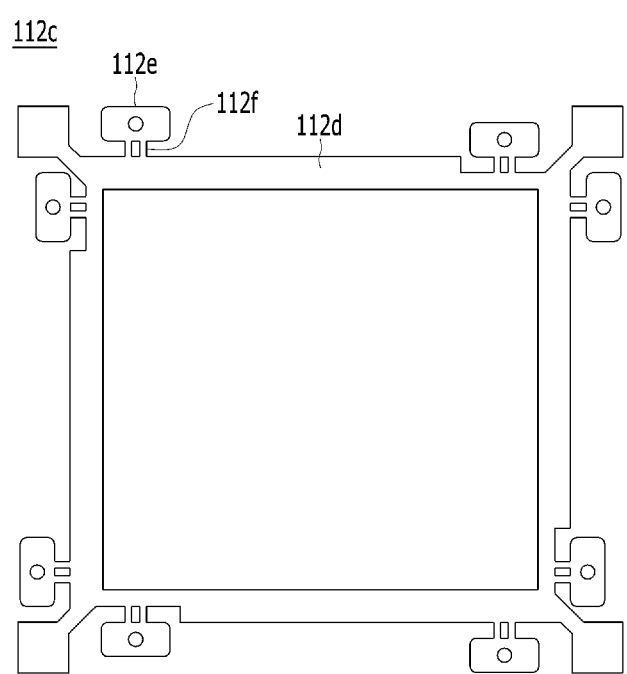
FIG. 6 is a plan diagram illustrating a second support plate, in accordance with one or more embodiments.

FIG. 5 is a perspective diagram illustrating an example in which a driver is connected to a fixed body and a movable body, in accordance with one or more embodiments. FIG. 6 is a plan diagram illustrating a second support plate, in accordance with one or more embodiments.

Figure 7:
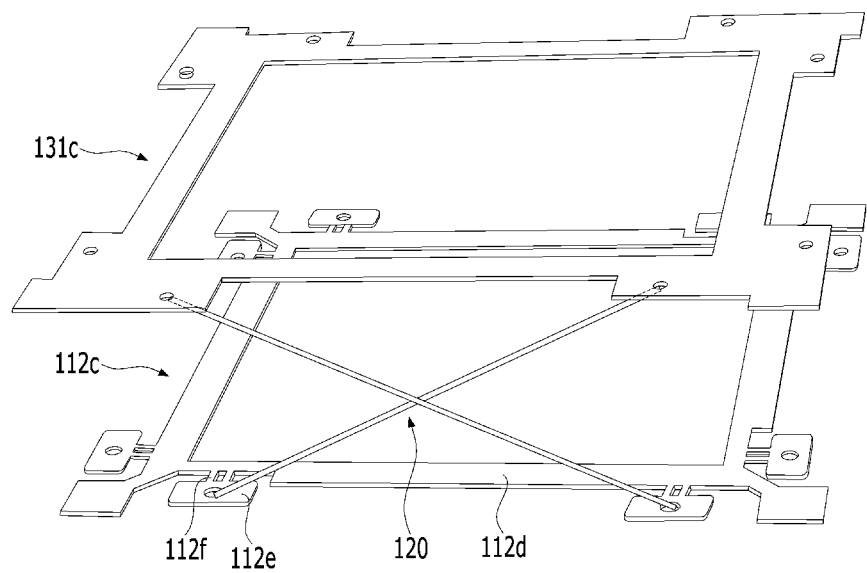
FIG. 7 is a perspective diagram illustrating an example in which a driver is connected to a first support plate and a second support plate, in accordance with one or more embodiments.
Figure 8:
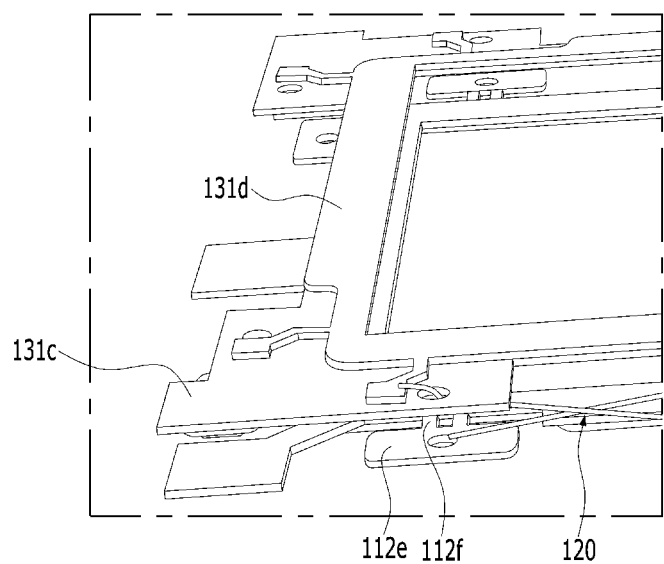
FIG. 8 is a perspective diagram illustrating an example in which a portion of a driver is fixed to a first support plate and a second support plate, in accordance with one or more embodiments.

FIG. 7 is a perspective diagram illustrating an example in which a driver is connected to a first support plate and a second support plate, in accordance with one or more embodiments. FIG. 8 is a perspective diagram illustrating an example in which a portion of a driver is fixed to a first support plate and a second support plate, in accordance with one or more embodiments.

FIGS. 9A to 11B are diagrams illustrating a driving force direction of a driver, in accordance with one or more embodiments.

Referring to FIGS. 5 to 8, the fixed body 130 may include a first fixed plate 131a, a second fixed plate 131b, and a first support plate 131c.

The first support plate 131c may be disposed between the first fixed plate 131a and the second fixed plate 131b, and the first fixed plate 131a, the second fixed plate 131b and the first support plate 131c may be coupled to the housing 131.

In an example, the first fixed plate 131a and the second fixed plate 131b may be optional components, and if desired, the first support plate 131c may be directly coupled to the housing 131 of the sensor actuator 100.

The movable body 110 may include a first sensor substrate 112a, a second sensor substrate 112b, and a second support plate 112c.

A second support plate 112c may be disposed between the first sensor substrate 112a and the second sensor substrate 112b, and the image sensor 111 may be disposed on the first sensor substrate 112a or the second sensor substrate 112b.

One of the first sensor substrate 112a and the second sensor substrate 112b may be an optional component, and if desired, the movable body 110 may only include the first sensor substrate 112a and the second support plate 112c, or may only include the second sensor substrate 112b and the second support plate 112c.

The driver 120 may include a plurality of wires, and the lengths of the plurality of wires may change as power is applied to each of the plurality of wires. Each of the plurality of wires may have a first end coupled to the fixed body 130, and a second end coupled to the movable body 110.

For example, each of the plurality of wires may have a first end coupled to the first support plate 131c, and a second end coupled to the second support plate 112c.

A substrate 131d (FIG. 8) that supplies power to the plurality of wires may be coupled to the first support plate 131c and the second support plate 112c. For example, referring to FIG. 8, a substrate 131d may be coupled to the first support plate 131c, and one end of the plurality of wires may be fixed to the substrate 131d. Although not illustrated in FIG. 8, a substrate that supplies power to the plurality of wires may also be coupled to the second support plate 112c.

Referring to FIG. 6, the second support plate 112c may include a body portion 112d, a support portion 112e, and an elastic portion 112f. In an example, the body portion 112d may have a plate shape surrounding the image sensor 111, and the support portion 112e may have a shape protruding from the body portion 112d. A plurality of wires may be fixed to the support portion 112e. The body portion 112d and the support portion 112e may be connected to each other by the elastic portion 112f. The elastic portion 112f may have a shape which may be bent according to changes in lengths of the plurality of wires.

One of a first end and a second end of each wire may be connected to the movable body 110 through the elastic portion 112f.

In the example embodiment, the elastic portion 112f may be a component of the movable body 110, but this is merely an example, and the elastic portion 112f may be formed on the first support plate 131c and may be provided as a component of the fixed body 130.

Referring to FIGS. 9A to 11B, the driver 120 may include a first wire portion 121, a second wire portion 122, a third wire portion 123, and a fourth wire portion 124.

Each of the first wire portion 121 to the fourth wire portion 124 may include a plurality of wires of which the lengths thereof may change when power is applied. For example, each of the first wire portion 121 to the fourth wire portion 124 may include two wires. In a non-limited example, the wire may be a shape memory alloy.

Each of the first wire portion 121 to the fourth wire portion 124 may have a first end that is fixed to the fixed body 130, and a second end that is fixed to the movable body 110. Additionally, the second end of each wire portion may be connected to the movable body 110 by the elastic portion 112f.

Accordingly, the movable body 110 may move relative to the fixed body 130 based on a change in the length of each wire portion.

The first wire portion 121 and the second wire portion 122 may provide driving forces to move the movable body 110 in a first direction (X-direction) parallel to the imaging plane 111a. In an example, the moving direction of the movable body 110 by the first wire portion 121 and the moving direction of the movable body 110 by the second wire portion 122 may be opposite to each other. For example, the movable body 110 may move in the +X-direction based on an operation by the first wire portion 121, and the movable body 110 may move in the −X-direction based on an operation by the second wire portion 122.

The third wire portion 123 and the fourth wire portion 124 may provide driving forces to move the movable body 110 in a second direction (Y-direction) parallel to the imaging plane 111a. In an example, the moving direction of the movable body 110 based on an operation by the third wire portion 123 and the moving direction of the movable body 110 based on an operation by the fourth wire portion 124 may be opposite to each other. For example, the movable body 110 may move in the +Y-direction based on an operation by the third wire portion 123, and the movable body 110 may move in the −Y-direction based on an operation by the fourth wire portion 124.

In an example, each of the first wire portion 121 to the fourth wire portion 124 may include two wires. A first end of each wire may be connected to the fixed body 130, and a second end of each wire may be connected to the movable body 110.

The two wires of the first wire portion 121 may be disposed to be spaced apart from each other in the second direction (Y-direction). Additionally, when viewed in the optical axis (Z-axis) direction, the two wires of the first wire portion 121 may have a shape having a length in the first direction (X-direction). For example, the two wires of the first wire portion 121 may extend in the +X-direction from a first end toward a second end, and the second ends of the two wires of the first wire portion 121 may be connected to the movable body through the elastic portion 112f.

The two wires of the second wire portion 122 may be disposed to be spaced apart from each other in the second direction (Y-direction). Additionally, when viewed in the optical axis (Z-axis) direction, the two wires of the second wire portion 122 may have a shape having a length in the first direction (X-direction). For example, the two wires of the second wire portion 122 may extend in the −X-direction from a first end toward the second end, and the second ends of the two wires of the second wire portion 122 may be connected to the movable body 110 through the elastic portion 112f.

Accordingly, the first wire portion 121 and the second wire portion 122 may be disposed to intersect each other in an X shape when viewed in the second direction (Y-direction).

The two wires of the third wire portion 123 may be disposed to be spaced apart in the first direction (X-direction). Additionally, when viewed in the optical axis (Z-axis) direction, the two wires of the third wire portion 123 may have a shape having a length in the second direction (Y-direction). For example, the two wires of the third wire portion 123 may extend in the +Y-direction from the first end to the second end, and the second ends of the two wires of the third wire portion 123 may be connected to the movable body 110 through the elastic portion 112f.

The two wires of the fourth wire portion 124 may be disposed to be spaced apart from each other in the first direction (X-direction). Additionally, when viewed in the optical axis (Z-axis) direction, the two wires of the fourth wire portion 124 may have a shape having a length in the second direction (Y-direction). For example, the two wires of the fourth wire portion 124 may extend in the −Y-direction from the first end to the second end, and the second ends of the two wires of the fourth wire portion 124 may be connected to the movable body 110 through the elastic portion 112f.

Accordingly, the third wire portion 123 and the fourth wire portion 124 may be disposed to intersect each other in an X shape when viewed in the first direction (X-direction).

Figure 9A:
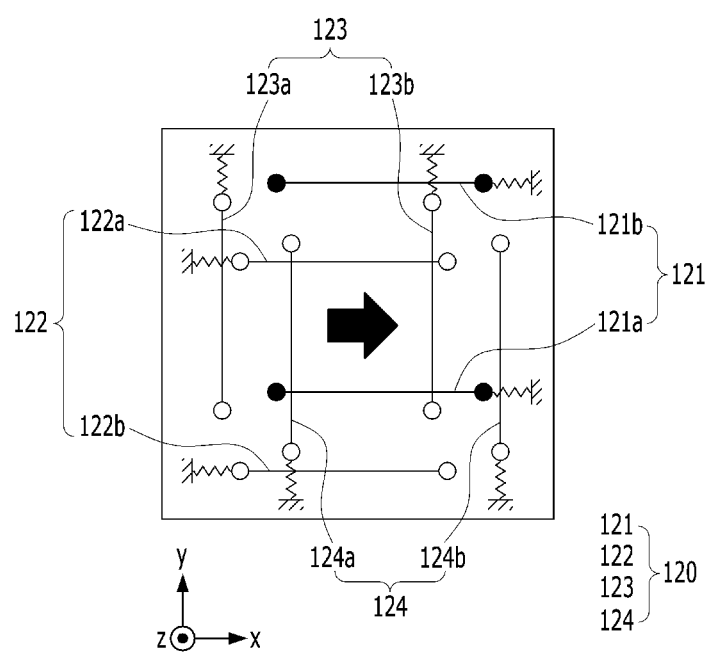
FIG. 9A, FIG. 9B, FIG. 10A, FIG. 10B, FIG. 11A, and FIG. 11B are diagrams illustrating a driving force direction of a driver, in accordance with one or more embodiments.

Referring to FIG. 9A, when power is applied to the first wire portion 121, a length of the first wire portion 121 may be reduced. Accordingly, the movable body 110 may be pulled in the direction of the arrow based on a change in length of the first wire portion 121, and accordingly, the movable body 110 may move in the +X-direction.

In this example, the elastic portion 112f connected to each of the second ends of the second wire portion 122 to the fourth wire portion 124 may be elastically deformed.

Figure 9B:
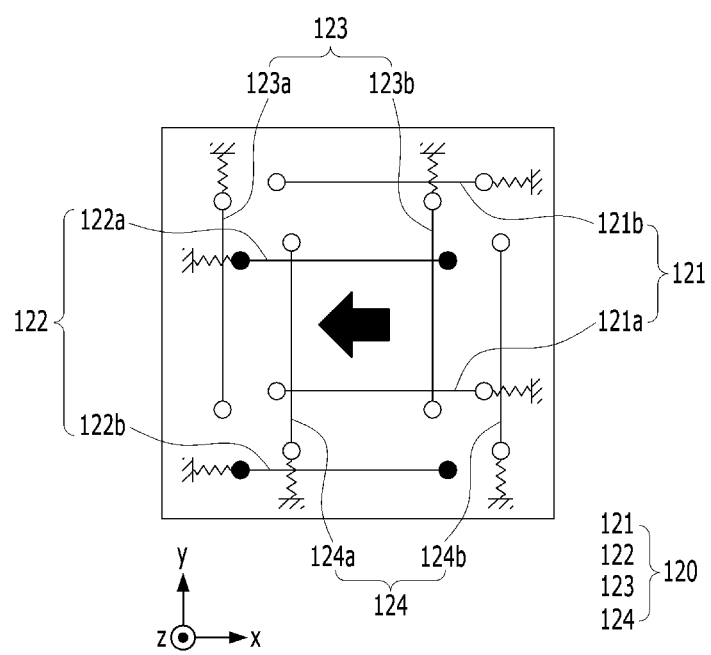

Referring to FIG. 9B, when power is applied to the second wire portion 122, a length of the second wire portion 122 may be reduced. Accordingly, the movable body 110 may be pulled in the direction of the arrow based on a change in length of the second wire portion 122, and accordingly, the movable body 110 may move in the −X-direction.

In this example, the elastic portion 112f connected to each of the second ends of the first wire portion 121, the third wire portion 123, and the fourth wire portion 124 may be elastically deformed.

Figure 10A:
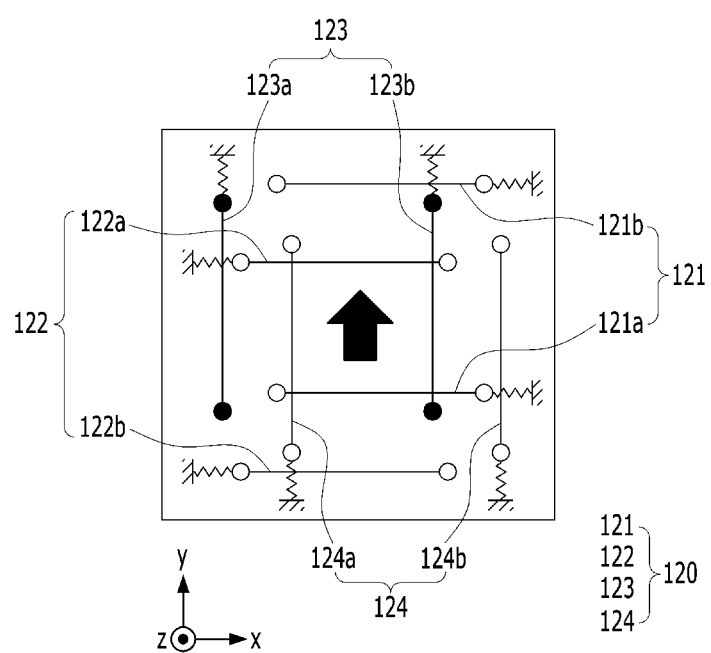

Referring to FIG. 10A, when power is applied to the third wire portion 123, a length of the third wire portion 123 may be reduced. Accordingly, the movable body 110 may be pulled in the direction of the arrow based on a change in length of the third wire portion 123, and accordingly, the movable body 110 may move in the +Y-direction.

In this example, the elastic portion 112f connected to each of the second ends of the first wire portion 121, the second wire portion 122, and the fourth wire portion 124 may be elastically deformed.

Figure 10B:
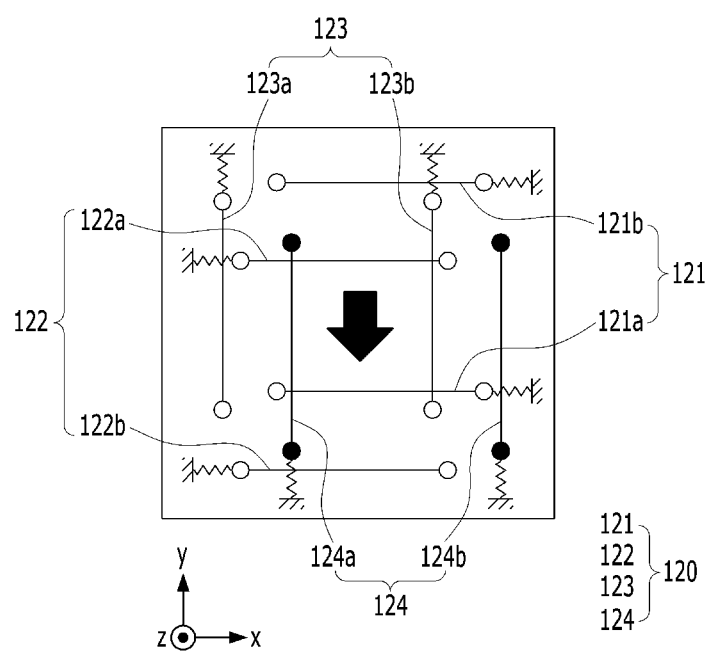

Referring to FIG. 10B, when power is applied to the fourth wire portion 124, a length of the fourth wire portion 124 may be reduced. Accordingly, the movable body 110 may be pulled in the direction of the arrow based on a change in length of the fourth wire portion 124, and accordingly, the movable body 110 may move in the −Y-direction.

In this example, the elastic portion 112f connected to each of the second ends of the first wire portion 121 to the third wire portion 123 may be elastically deformed.

The movable body 110 may rotate about the optical axis (Z-axis) based on at least two wires that create driving forces in opposite directions.

Figure 11A:
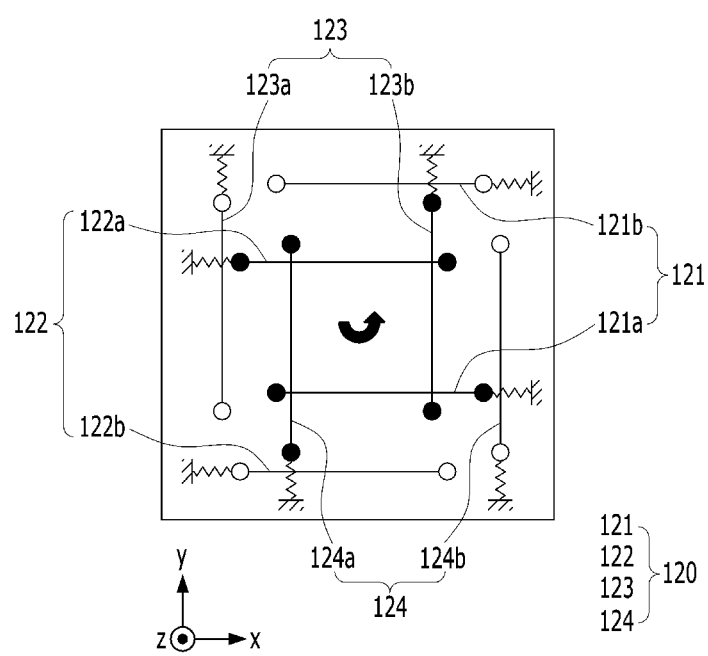
Figure 11B:
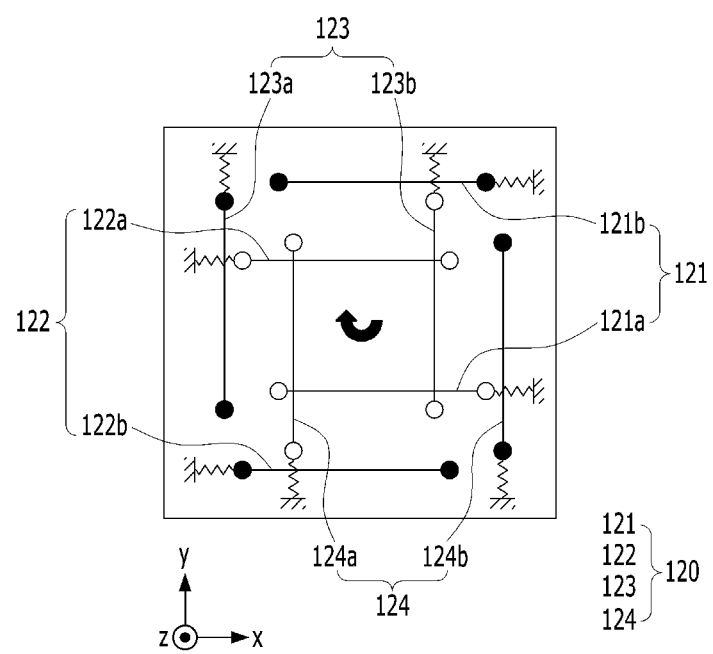

Referring to FIGS. 11A and 11B, by applying power to one wire (four wires) of the two wires included in each wire portion, the movable body 110 may rotate in a clockwise direction or a counterclockwise direction.

FIGS. 11A and 11B illustrate an example of rotating the movable body 110 by four wires. However, this is merely an example, and the movable body 110 may rotate by at least two wires that create driving forces in opposite directions.

FIGS. 12A to 14B are diagrams illustrating a driving force direction of a driver, in accordance with one or more embodiments.

Referring to FIGS. 12A to 14B, the driver 120 may include a first wire portion 121, a second wire portion 122, a third wire portion 123, a fourth wire portion 124, a fifth wire portion 125 and a sixth wire portion 126.

Each of the first wire portion 121 to the sixth wire portion 126 may include a wire of which a length changes when power is applied thereto. In an example, the wire may be a shape memory alloy.

A first end of the first wire portion 121 to the sixth wire portion 126 may be fixed to the fixed body 130, and a second end of the first wire portion 121 to the sixth wire portion 126 may be fixed to the movable body 110. Additionally, the second end of each wire portion may be connected to the movable body 110 by the elastic portion 112f.

Accordingly, the movable body 110 may move relative to the fixed body 130 based on a change in the length of each wire portion.

The first wire portion 121 and the second wire portion 122 may provide a driving force to move the movable body 110 in a first direction (X-direction) parallel to the imaging plane 111a. In an example, the moving direction of the movable body 110 based on the first wire portion 121 and the moving direction of the movable body 110 based on the second wire portion 122 may be opposite to each other. For example, the movable body 110 may move in the +X-direction based on the first wire portion 121, and the movable body 110 may move in the −X-direction by the second wire portion 122.

The third wire portion 123 and the fourth wire portion 124 may provide a driving force to move the movable body 110 in the second direction (Y-direction) parallel to the imaging plane 111a. In an example, the moving direction of the movable body 110 based on the third wire portion 123 and the moving direction of the movable body 110 based on the fourth wire portion 124 may be opposite to each other. For example, the movable body 110 may move in the +Y-direction based on the third wire portion 123, and the movable body 110 may move in the −Y-direction by the fourth wire portion 124.

The first wire portion 121 may have a shape having a length in the first direction (X-direction) when viewed in the optical axis (Z-axis) direction. For example, the first wire portion 121 may extend in the +X-direction from a first end toward the second end, and the second end of the first wire portion 121 may be connected to the movable body 110 through the elastic portion 112f.

The second wire portion 122 may have a shape having a length in the first direction (X-direction) when viewed in the optical axis (Z-axis) direction. For example, the second wire portion 122 may extend from one end toward the other end in the −X-direction, and the other end of the second wire portion 122 may be connected to the movable body 110 through the elastic portion 112f.

Accordingly, the first wire portion 121 and the second wire portion 122 may be disposed to intersect each other in an X shape when viewed in the second direction (Y-direction).

The third wire portion 123 may have a shape having a length in the second direction (Y-direction) when viewed in the optical axis (Z-axis) direction. For example, the third wire portion 123 may extend from a first end toward a second end in the +Y-direction, and the second end of the third wire portion 123 may be connected to the movable body 110 through the elastic portion 112f.

The fourth wire portion 124 may have a shape having a length in the second direction (Y-direction) when viewed in the optical axis (Z-axis) direction. For example, the fourth wire portion 124 may extend from a first end toward a second end in the −Y-direction, and the second end of the fourth wire portion 124 may be connected to the movable body 110 through the elastic portion 112f.

Accordingly, the third wire portion 123 and the fourth wire portion 124 may be disposed to intersect each other in an X shape when viewed in the first direction (X-direction).

The first wire portion 121 to the fourth wire portion 124 may be disposed to intersect the center of the imaging plane 111a. Accordingly, the first wire portion 121 to the fourth wire portion 124 may be disposed in the space on the lower side of the image sensor 111, preferably.

Figure 12A:
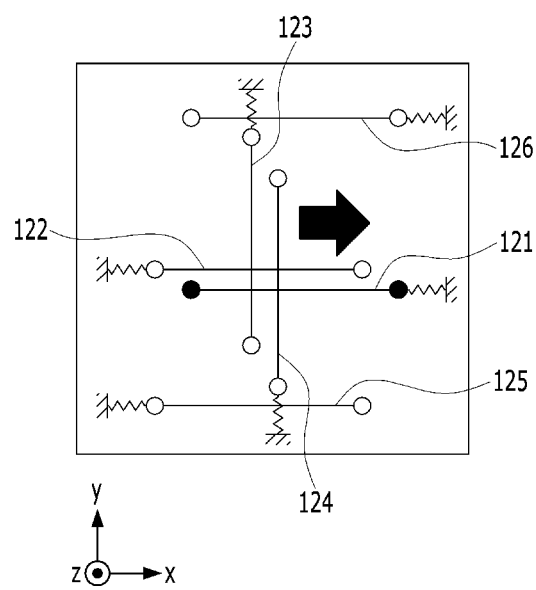
FIG. 12A, FIG. 12B, FIG. 13A, FIG. 13B, FIG. 14A, and FIG. 14B are diagrams illustrating a driving force direction of a driver, in accordance with one or more embodiments.

Referring to FIG. 12A, when power is applied to the first wire portion 121, a length of the first wire portion 121 may be reduced. Accordingly, the movable body 110 may be pulled in the direction of the arrow based on a change in length of the first wire portion 121, and accordingly, the movable body 110 may move in the +X-direction.

In this example, the elastic portion 112f connected to each of the second ends of the second wire portion 122 to the sixth wire portion 126 may be elastically deformed.

Figure 12B:
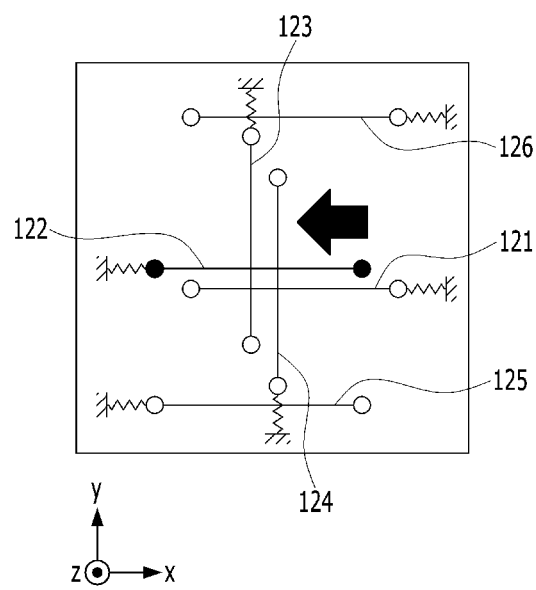

Referring to FIG. 12B, when power is applied to the second wire portion 122, a length of the second wire portion 122 may be reduced. Accordingly, the movable body 110 may be pulled in the direction of the arrow based on a change in length of the second wire portion 122, and accordingly, the movable body 110 may move in the −X-direction.

In this example, the elastic portion 112f connected to each of the second ends of the first wire portion 121, the third wire portion 123 to the sixth wire portion 126 may be elastically deformed.

Figure 13A:
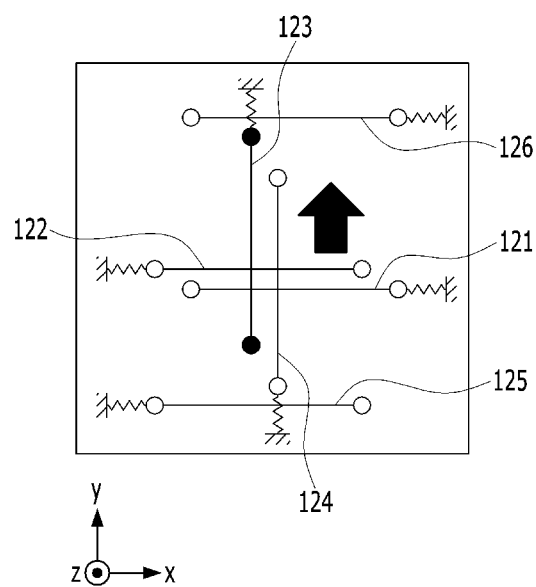

Referring to FIG. 13A, when power is applied to the third wire portion 123, a length of the third wire portion 123 may be reduced. Accordingly, the movable body 110 may be pulled in the direction of the arrow based on a change in the length of the third wire portion 123, and accordingly, the movable body 110 may move in the +Y-direction.

In this example, the elastic portion 112f connected to each of the second ends of the first wire portion 121, the second wire portion 122, the fourth wire portion 124 to the sixth wire portion 126 may be elastically deformed.

Figure 13B:
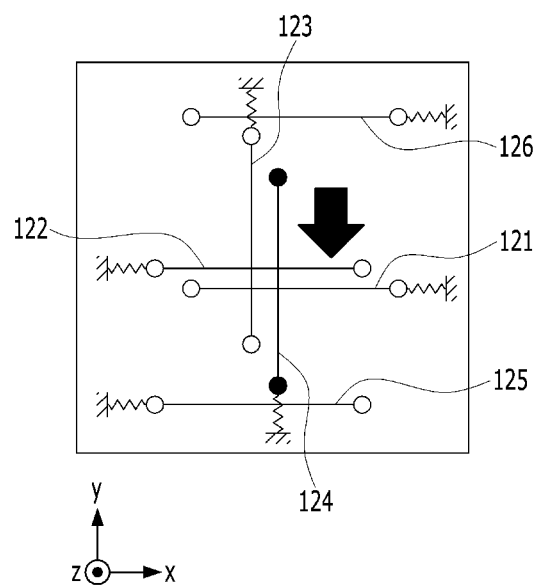

Referring to FIG. 13B, when power is applied to the fourth wire portion 124, a length of the fourth wire portion 124 may be reduced. Accordingly, the movable body 110 may be pulled in the direction of the arrow based on a change in length of the fourth wire portion 124, and accordingly, the movable body 110 may move in the −Y-direction.

In this example, the elastic portion 112f connected to each of the second ends of the first wire portion 121 to the third wire portion 123, the fifth wire portion 125, and the sixth wire portion 126 may be elastically deformed.

Figure 14A:
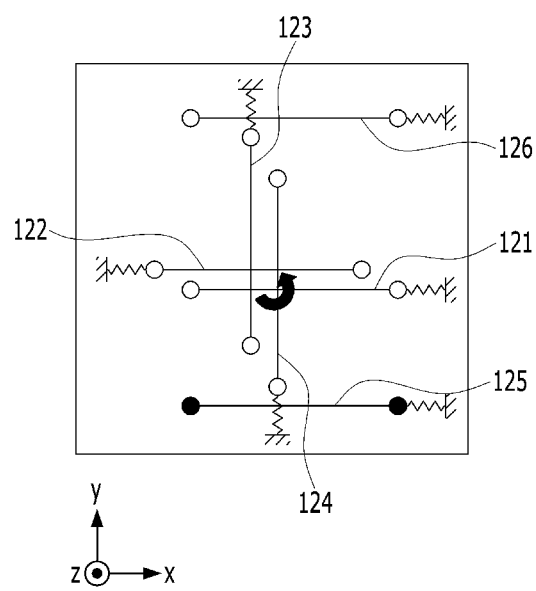
Figure 14B:
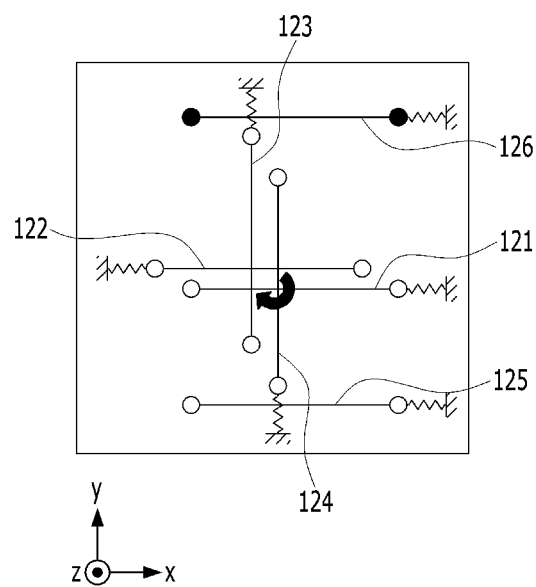

Referring to FIGS. 14A and 14B, the movable body 110 may rotate based on the fifth wire portion 125 and the sixth wire portion 126. For example, the movable body 110 may rotate in a counterclockwise direction based on the fifth wire portion 125, and the movable body 110 may rotate in a clockwise direction based on the sixth wire portion 126.

The fifth wire portion 125 and the sixth wire portion 126 may have a shape having a length in the first direction (X-direction) when viewed in the optical axis (Z-axis) direction. For example, the fifth wire portion 125 and the sixth wire portion 126 may extend in the +X-direction from a first end to a second end, and the second ends of the fifth wire portion 125 and the sixth wire portion 126 may be connected to the movable body 110 through the elastic portion 112f. Alternatively, the fifth wire portion 125 and the sixth wire portion 126 may extend in the −X-direction from a first end to the second end.

The fifth wire portion 125 and the sixth wire portion 126 may be spaced apart from each other in a direction parallel to the imaging plane 111a. FIGS. 14A and 14B illustrate an example in which the fifth wire portion 125 and the sixth wire portion 126 may be spaced apart in the second direction (Y-direction). However, this is merely an example, and the fifth wire portion 125 and the sixth wire portion 126 may be spaced apart from each other in the first direction (X-direction).

However, since the image sensor 111 has a rectangular shape, the fifth wire portion 125 and the sixth wire portion 126 may have a length along the short side of the image sensor 111, and may be spaced apart from each other along the long side of the image sensor 111.

Figure 15:
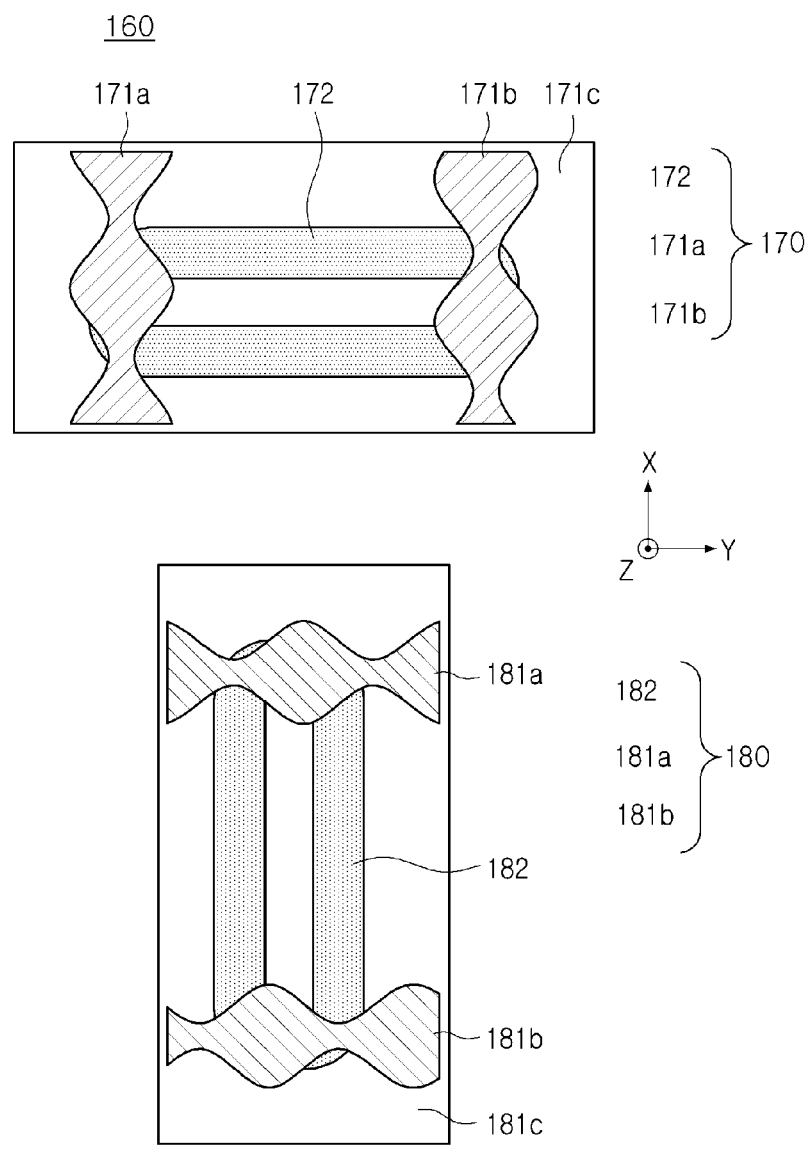
FIG. 15 is a diagram illustrating a configuration of a position sensing portion, in accordance with one or more embodiments.
Figure 16:
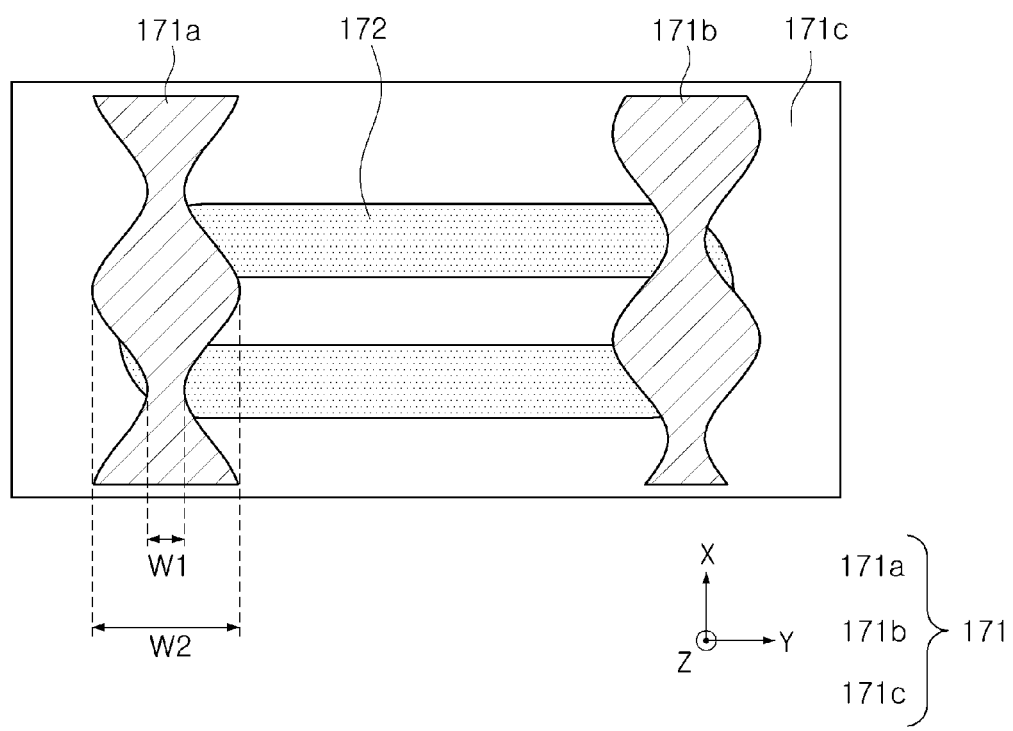
FIG. 16 is a diagram illustrating a sensing yoke portion and a sensing coil of a position sensing portion, in accordance with one or more embodiments.

FIG. 15 is a diagram illustrating a configuration of a position sensing portion. FIG. 16 is a diagram illustrating a sensing yoke portion and a sensing coil of a position sensing portion, in accordance with one or more embodiments.

Referring to FIGS. 1, 15 and 16, the sensor actuator 100 according to an example embodiment may further include a position sensing portion 160.

For example, when the image sensor 111 moves in the first direction (X-direction), the position of the image sensor 111 may be detected by the position detecting portion 160, and when the image sensor 111 moves in the second direction (Y-direction), the position of the image sensor 111 may be detected by the position detecting portion 160.

The position sensing portion 160 may include a first position sensor 170 and a second position sensor 180. The first position sensor 170 may be used to detect a position of the image sensor 111 in a first direction (X-direction), and the second position sensor 180 may be used to detect a position of the image sensor 111 in a second direction (Y-direction) of the image sensor 111.

The first position sensor 170 may include a first sensing coil 172 and a first sensing yoke portion 171 (171a, 171b). One of the first sensing coil 172 and the first sensing yoke portion 171 may be disposed on the movable body 110, and the other may be disposed on the fixed body 130. In an example embodiment, the first sensing yoke portion 171 may be disposed on the housing 131, and the first sensing coil 172 may be disposed on the sensor substrate 112. Accordingly, the first sensing coil 172 may be a moving member that moves together with the image sensor 111.

The first sensing coil 172 and the first sensing yoke portion 171 may be disposed to oppose each other in the optical axis (Z-axis) direction.

The first sensing yoke portion 171 may include a first sensing yoke 171a and a second sensing yoke 171b spaced apart from each other.

The second position sensor 180 may include a second sensing coil 182 and a second sensing yoke portion 181 (181a, 181b). One of the second sensing coil 182 and the second sensing yoke portion 181 may be disposed on the movable body 110, and the other may be disposed on the fixed body 130. In an example embodiment, the second sensing yoke portion 181 may be disposed on the housing 131, and the second sensing coil 182 may be disposed on the sensor substrate 112. Accordingly, the second sensing yoke portion 181 may be a moving member that moves together with the image sensor 111.

The second sensing coil 182 and the second sensing yoke portion 181 may be disposed to oppose each other in the optical axis (Z-axis) direction.

The second sensing yoke portion 181 may include a third sensing yoke 181a and a fourth sensing yoke 181b spaced apart from each other.

Since the configurations and sensing methods of the first position sensor 170 and the second position sensor 180 are the same, only the first position sensor 170 will be described for convenience of description.

Inductance of the first sensing coil 172 may change according to a change in the position of the first sensing yoke portion 171 opposing each other.

Specifically, when the relative positions of the first sensing coil 172 and the first sensing yoke portion 171 are changed, a magnitude of an eddy current of the first sensing yoke unit 171 affecting inductance of the first sensing coil 172 may change, strength of the magnetic field may change according to the eddy current, and accordingly, inductance of the first sensing coil 172 may be changed.

The first sensing yoke portion 171 may be a conductor or a magnetic material.

The sensor actuator 100 may determine a displacement of the image sensor 111 from changes in inductance of the first sensing coil 172. For example, the sensor actuator 100 may additionally include at least one capacitor, and the at least one capacitor and the first sensing coil 172 may form a predetermined oscillation circuit.

For example, at least one capacitor may be provided to correspond to the number of first sensing coils 172, and a capacitor and a first sensing coil 172 may be configured as a predetermined LC oscillator. Additionally, at least one capacitor and the first sensing coil 172 may be configured as a well-known Colpitts oscillator.

The sensor actuator 100 may determine a displacement of the image sensor 111 from a change in a frequency of an oscillation signal generated by the oscillation circuit. Specifically, when inductance of the first sensing coil 172 forming the oscillation circuit changes, a frequency of the oscillation signal generated by the oscillation circuit may change, such that displacement of the image sensor 111 may be detected based on the changes in frequency.

Referring to FIG. 16, the first sensing yoke portion 171 may include a first sensing yoke 171a and a second sensing yoke 171b.

In an example embodiment, the first sensing yoke portion 171 may further include a support member 171c on which the first sensing yoke 171a and the second sensing yoke 171b are disposed. The support member 171c may be attached to the housing 131.

The first sensing yoke 171a and the second sensing yoke 171b may be attached to the support member 171c, or the first sensing yoke 171a and the second sensing yoke 171b may be integrated with the support member 171c by an insert injection method, as only an example.

However, an example embodiment thereof is not limited thereto, and the first sensing yoke portion 171 may not include the support member 171c. In this example, the first sensing yoke 171a and the second sensing yoke 171b may be directly attached to the housing 131, or the first sensing yoke 171a and the second sensing yoke 171b may be integrated with the housing 131 by an insert injection method.

The first sensing yoke 171a and the second sensing yoke 171b may be disposed to be spaced apart from each other in the second direction (Y-direction). Additionally, each sensing yoke may be disposed to oppose a portion of the first sensing coil 172. For example, the first sensing yoke 171a and the second sensing yoke 171b may be disposed to oppose the first sensing coil 172 in the optical axis (Z-axis) direction.

A direction of a current flowing in a portion of the first sensing coil 172 opposing the first sensing yoke 171a may be different from a direction of a current flowing in a portion of the first sensing coil 172 opposing the second sensing yoke 171b. In an example embodiment, a direction of the current flowing in a portion of the first sensing coil 172 opposing the first sensing yoke 171a may be opposite to a direction of the current flowing in a portion of the first sensing coil 172 opposing the second sensing yoke 171b.

The distance between the first sensing yoke 171a and the second sensing yoke 171b in the second direction (Y-direction) may be shorter than a distance between both ends of the first sensing coil 172 in the second direction (Y-direction).

Each of the first sensing yoke 171a and the second sensing yoke 171b may have a width that varies according to coordinates of the direction (e.g., the X-direction) in which the image sensor 111 moves.

The first sensing yoke 171a and the second sensing yoke 171b may output magnetic flux due to an eddy current, respectively. A magnitude of the eddy current and a magnitude of the magnetic flux may be dependent on each other.

A magnitude of the eddy current formed in each of the first sensing yoke 171a and the second sensing yoke 171b may be dependent on a width of a portion in which the first sensing yoke 171a and the second sensing yoke 171b oppose the first sensing coil 172.

For example, since the first sensing coil 172 may move in the first direction (X-direction) with respect to the first sensing yoke 171a and the second sensing yoke 171b, a magnitude of the eddy current formed in each of the first sensing yoke 171a and the second sensing yoke 171b may be dependent on the relative movement of the first sensing coil 172 in the first direction (X-direction).

Since inductance of the first sensing coil 172 may be a sum of the mutual inductance caused by the magnetic flux and self-inductance of the first sensing coil 172 or a difference therebetween, inductance may vary depending on a magnitude of the magnetic flux caused by the eddy current. The position of the image sensor 111 may be detected based on inductance of the first sensing coil 172.

Since the changes in size of the eddy currents of the first sensing yoke 171a and the second sensing yoke 171b according to displacement of movement of the image sensor 111 is linear, the position of the image sensor 111 may be precisely detected.

Each of the first sensing yoke 171a and the second sensing yoke 171b may have a shape in which a width may repeatedly increase or decrease in the direction in which the image sensor 111 moves (e.g., the X-direction). The width may refer to a width in the second direction (Y-direction).

In an example, the first sensing yoke 171a may have a shape in which the width may be reduced, increased, decreased, and increased in the first direction (X-direction). The second sensing yoke 171b may have a shape in which a width may be repeatedly decreased, increased, decreased, increased, and reduced in the first direction (X-direction).

Each of the first sensing yoke 171a and the second sensing yoke 171b may have a shape in which the width increases or decreases in one direction, and positions of the first sensing yoke 171a and the second sensing yoke 171b in which widths increase or decrease may have different shapes.

Each of the first sensing yoke 171a and the second sensing yoke 171b may have a plurality of minimum widths and a plurality of maximum widths.

A boundary line defining the width of each sensing yoke may have a sinusoidal wave shape.

A winding thickness of the first sensing coil 172 may be greater than a minimum width of each sensing yoke, and may be smaller than a maximum width of each sensing yoke.

A position in which the first sensing yoke 171a has a minimum width may be different from a position in which the second sensing yoke 171b has a minimum width. Additionally, the position in which the first sensing yoke 171a has a maximum width may be different from the position in which the second sensing yoke 171b has a maximum width.

Accordingly, coordinates of the image sensor 111 in one direction (e.g., X-direction), corresponding to a maximum width (a maximum width in the second direction (Y-direction)) of the first sensing yoke 171a, and coordinates of the image sensor 111 in one direction (e.g., X-direction), corresponding to a maximum width (a maximum width in the second direction (Y-direction)) may be different.

For example, coordinates of the image sensor 111 in the X-direction, corresponding to a minimum width W1 of the first sensing yoke 171a, and coordinates of the image sensor 111 in the X-direction, corresponding to the minimum width of the second sensing yoke 171b, may be different from each other, and coordinates in the X-direction, corresponding to the maximum width W2 of the first sensing yoke 171a, and coordinates in the X-direction, corresponding to the maximum width of the second sensing yoke 171b, may be different from each other.

Accordingly, the effect of displacement of the first sensing yoke 171a in one direction in a pattern of change in a magnitude of the eddy current of the first sensing yoke 171a according to a relative movement of the first sensing coil 172 and the effect of displacement of the second sensing yoke 171b in one direction in a pattern of change in a magnitude of the eddy current of the second sensing yoke 171b according to a relative movement of the first sensing coil 172 may be complementary to each other.

Accordingly, inductance of the first sensing coil 172 may change stably according to integration of an inductance change factor according to changes in the magnitude of the eddy current of the first sensing yoke 171a and an inductance change factor according to changes in the magnitude of the eddy current of the second sensing yoke 171b, and the sensor actuator 100 according to an example embodiment may detect movement of the image sensor 111 stably and/or accurately, and also linearly and/or efficiently.

The length of the first sensing yoke 171a in the first direction (X-direction) may be one or more periods of a period of a width of the first sensing yoke 171a, and the length of the second sensing yoke 171b in the first direction (X-direction) may be one or more periods of a period of the second sensing yoke 171b.

A width of each of the first sensing yoke 171a and the second sensing yoke 171b may be repeated every one period. A length of the period of the width of each of the first sensing yoke 171a and the second sensing yoke 171b in the first direction (X-direction) may vary depending on a movement sensing range of the image sensor 111.

Due to a difference between coordinates of the image sensor 111 in one direction (e.g., X-direction), corresponding to the maximum width of the first sensing yoke 171a and coordinates of the image sensor 111 in one direction (e.g., X-direction), corresponding to the maximum width of the second sensing yoke 171b, an output value of the first sensing coil 172 according to the movement of each sensing yoke may be a sine wave having a phase difference of 90 degrees.

Accordingly, an output value obtained by arctangent-processing the output of a sine wave having a phase difference of 90 degrees may be linear with respect to movement of the image sensor 111.

Each of the first sensing yoke 171a and the second sensing yoke 171b may include at least one of copper, silver, gold, and aluminum, as only examples. Since copper, silver, gold, and aluminum have relatively high conductivity, an overall magnitude of the eddy current formed in the first sensing yoke 171a and the second sensing yoke 171b according to a magnetic flux of the first sensing coil 172 may increase, and sensitivity of movement sensing of the image sensor 111 may be further improved.

In example embodiments, the first sensing coil 172 may include a plurality of sensing coils to which an inductance change factor according to changes in the size of an eddy current of the first sensing yoke 171a and an inductance change factor according to changes in the size of an eddy current of the second sensing yoke 171b are applied, respectively. In this example, the first sensing yoke 171a and the second sensing yoke 171b may be disposed to oppose different sensing coils.

Since inductance of each of the plurality of sensing coils is used together to generate information on movement of the image sensor 111, the inductance change factor according to changes in the size of the eddy current of the first sensing yoke 171a and the inductance change factor according to changes in the size of the eddy current of the second sensing yoke 171b may be used integrally, and the sensor actuator 100 in an example embodiment may linearly sense movement of the image sensor 111.

Figure 17A:
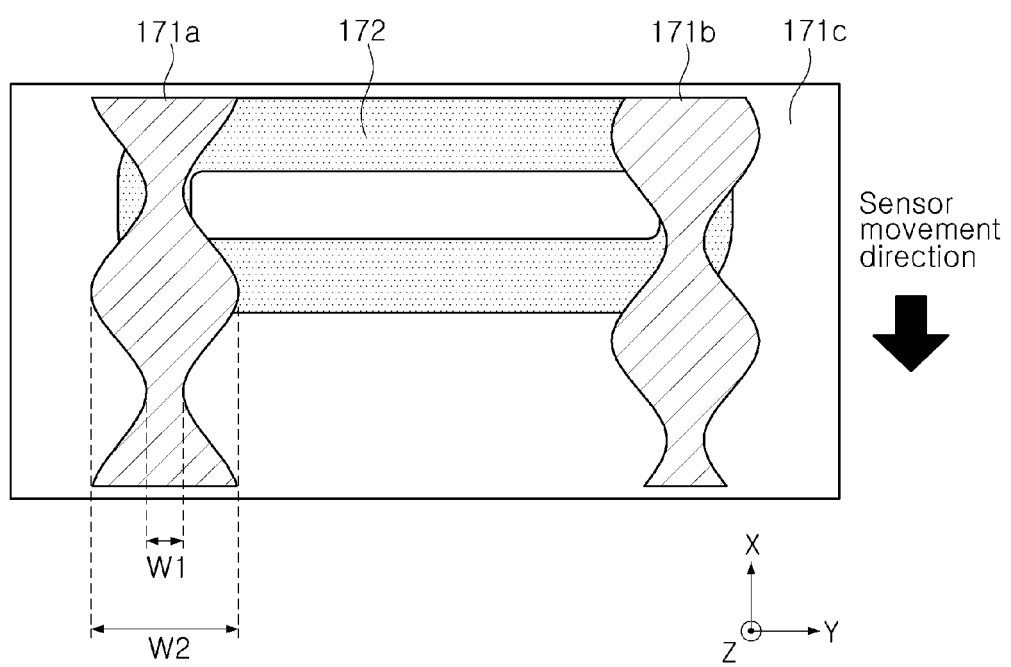
FIGS. 17A and 17B are diagrams illustrating changes in a positional relationship between a first sensing yoke portion and a first sensing coil, in accordance with one or more embodiments.
Figure 17B:
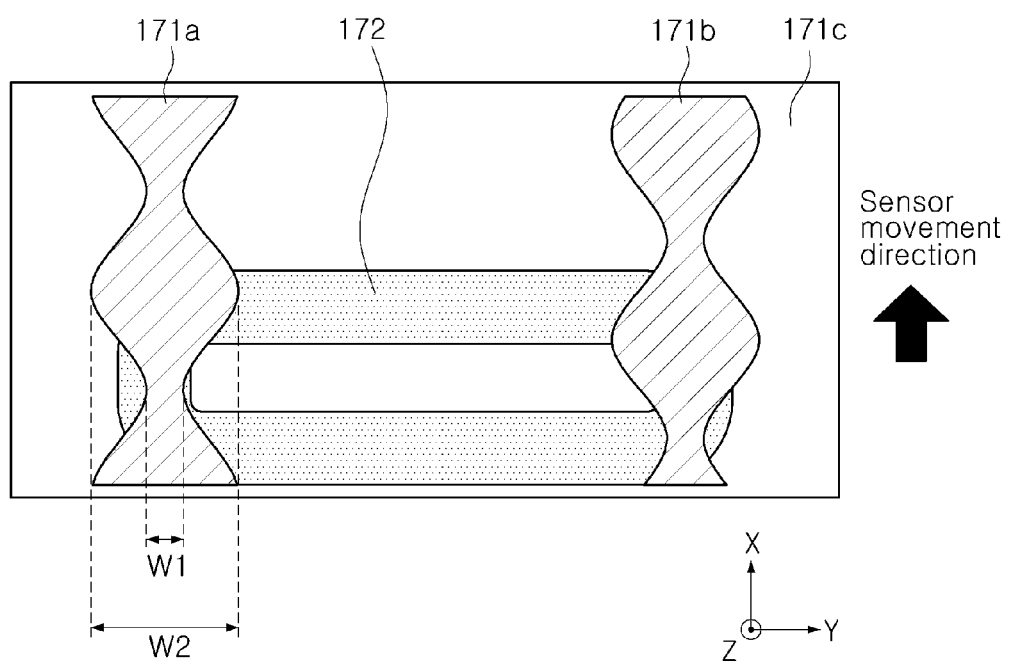

FIGS. 17A and 17B are diagrams illustrating changes in a positional relationship between a first sensing yoke portion and a first sensing coil, in accordance with one or more embodiments.

Referring to FIGS. 17A and 17B, since a width of the first sensing yoke portion 171 (171a, 171b) may change in the moving direction of the image sensor 111, a change may occur in a region in which the first sensing yoke unit 171 and the first sensing coil 172 overlap in the optical axis (Z-axis) direction as the image sensor 111 moves.

A width of the portions of first sensing yoke 171a and the second sensing yoke 171b overlapping the first sensing coil 172 in the optical axis (Z-axis) direction may vary according to movement of the sensing yoke 171b in the first direction (X-direction). Accordingly, inductance of the first sensing coil 172 may vary according to movement of the image sensor 111 in the first direction (X-direction), and movement of the image sensor 111 in the first direction (X-direction) may be sensed.

Figure 18:
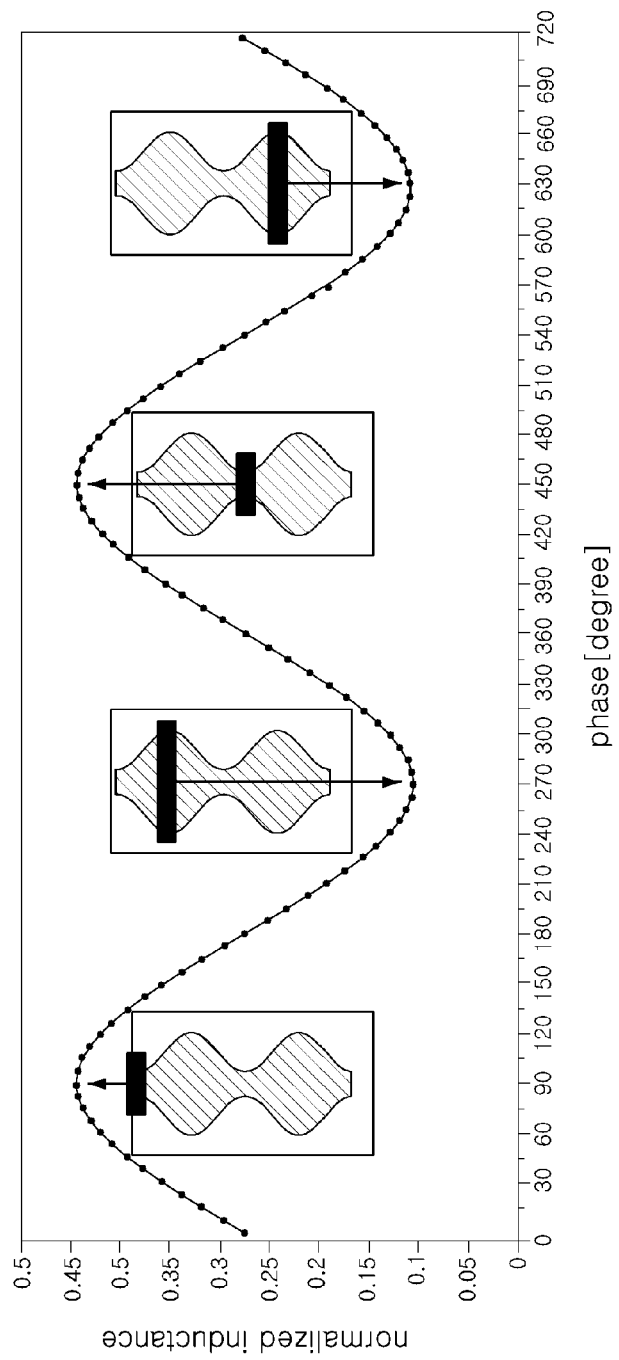
FIG. 18 is a graph illustrating inductance of a first sensing coil according to movement of an image sensor in one direction, in accordance with one or more embodiments.

FIG. 18 is a graph illustrating inductance of a first sensing coil according to movement of an image sensor in one direction.

Referring to FIG. 18, a period of a width of the first sensing yoke 171a may correspond to a phase of 360 degrees.

When a specific region (e.g., a center of the first sensing coil 172) of the first sensing coil 172 and a minimum width of the first sensing yoke 171a overlap, normalized inductance of the first sensing coil 172 may have a maximum value.

When a specific region (e.g., the center of the first sensing coil 172) of the first sensing coil 172 and a maximum width of the first sensing yoke 171a overlap, normalized inductance of the first sensing coil 172 may have a minimum value.

In an example, the normalized inductance may be a value to which a specific weight is applied to the inductance.

Figure 19A:
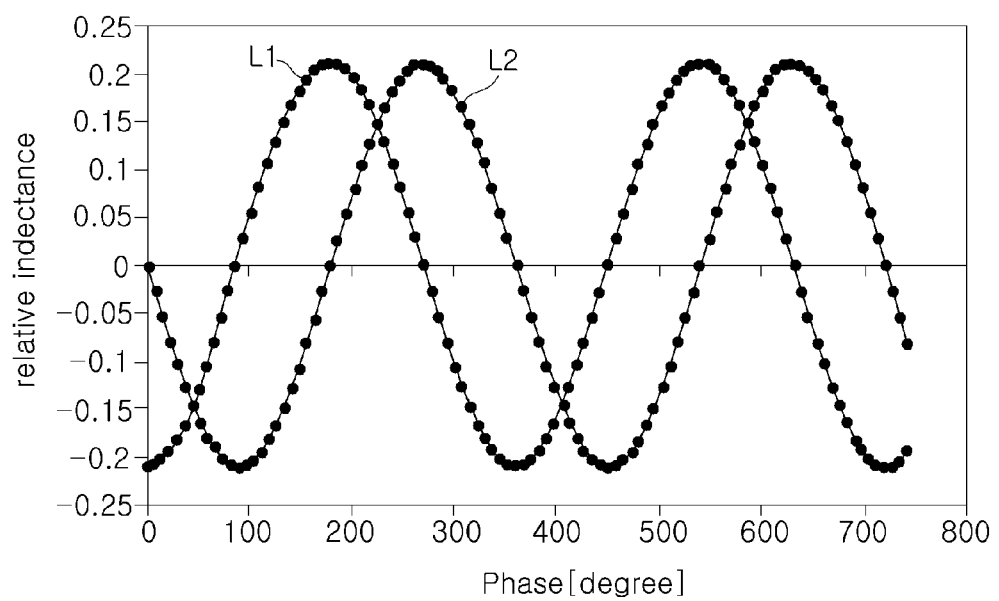
FIG. 19A is a graph illustrating a plurality of levels of inductance of a first sensing coil corresponding to a first sensing yoke and a second sensing yoke of a sensor actuator, respectively, in accordance with one or more embodiments.

FIG. 19A is a graph illustrating a plurality of levels of inductance of a first sensing coil corresponding to a first sensing yoke and a second sensing yoke of a sensor actuator, respectively, in accordance with one or more embodiments.

Referring to FIG. 19A, a phase difference between first inductance L1 of the first sensing coil 172 corresponding to the first sensing yoke 171a and second inductances L2 of the first sensing coil 172 corresponding to the second sensing yoke 171b may be 90 degrees. In an example, the inductance may be a value that is obtained by subtracting a specific value such that an average value may become 0 from the normalized inductance.

Figure 19B:
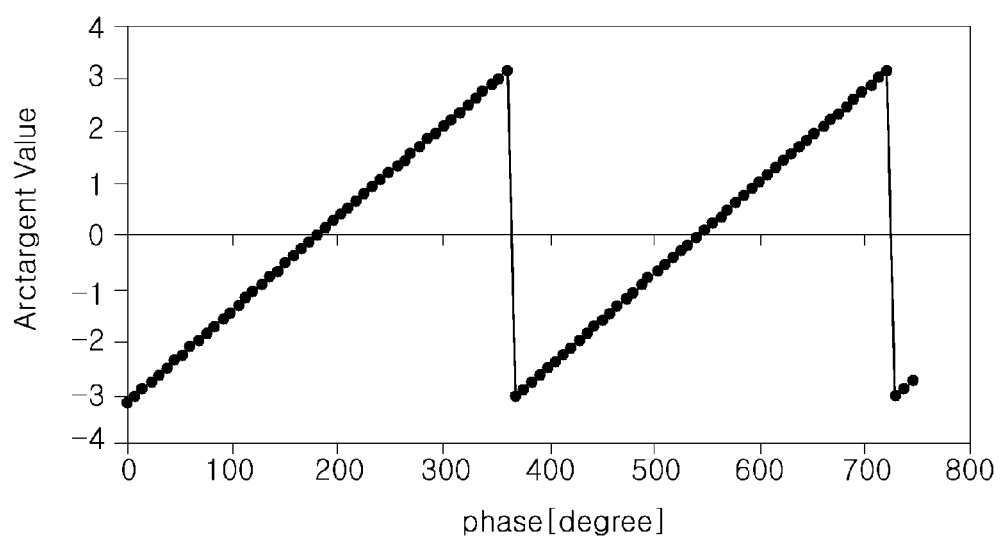
FIG. 19B is a graph illustrating arctangent processing values of a plurality of levels of inductance illustrated in FIG. 19A.

FIG. 19B is a graph illustrating arctangent-processing values of a plurality of levels of inductance illustrated in FIG. 19A.

Referring to FIG. 19B, an arctangent-processing value may change linearly with a change in phase.

When the first inductance L1 and the second inductance L2 have a phase difference of 90 degrees from each other, one of the first inductance L1 and the second inductance L2 may correspond to {sin(phase)} and the other may correspond to {cos(phase)}.

In a trigonometric model, an angle from an origin to one point of the circle may correspond to a phase of one period of the sensing yoke, a distance from the origin to one point of the circle may be r, and an X-direction vector value and a Y-direction vector value from an origin to one point of the circle may be X and Y, respectively.

{sin(phase)} may be (y/r) and {cos(phase)} may be (x/r). {tan(phase)} may be (y/x), {sin(phase)}/{cos(phase)} may be satisfied, and (second inductance)/(first inductance) may be satisfied.

Accordingly, arctan{(second inductance)/(first inductance)} may correspond to a phase of one period of the displacement identification layer, and may be an arctan processing value.

Figure 20:
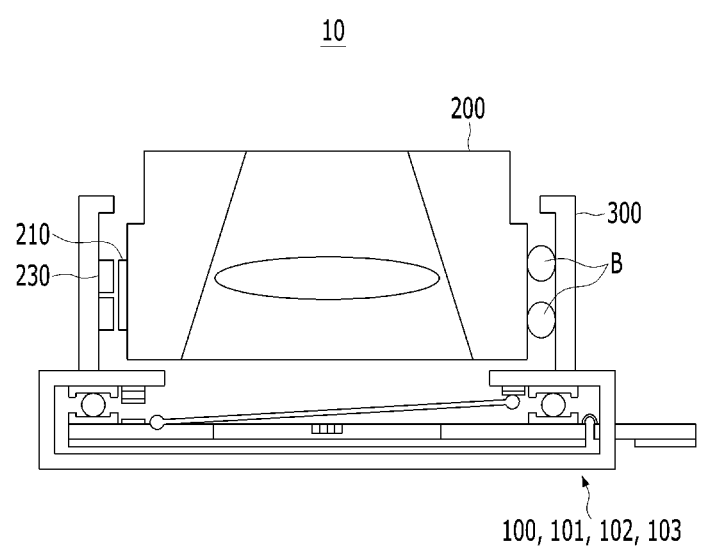
FIG. 20 is a cross-sectional diagram illustrating an example camera module, in accordance with one or more embodiments.

FIG. 20 is a cross-sectional diagram illustrating a camera module 10, in accordance with one or more embodiments.

Referring to FIG. 20, the camera module 10 in an example embodiment may include a lens module 200, a housing 300 and a sensor actuator 100.

At least one lens that images a subject may be accommodated in the lens module 200. When a plurality of lenses are disposed in the lens module 200, the plurality of lenses may be disposed in the lens module 200 in the optical axis (Z-axis).

In an example, the lens module 200 may have a hollow cylindrical shape.

In another example embodiment, the lens module 200 may include a lens barrel and a lens holder. In this example, at least one lens may be accommodated in the lens barrel, and the lens barrel may be coupled to the lens holder.

The lens module 200 may be accommodated in the housing 300. Additionally, the housing 300 may be coupled to the housing 131 of the sensor actuator 100.

The sensor actuator 100 may be the sensor actuator 100 described in the aforementioned example embodiment.

An image sensor 111 may be disposed in the sensor actuator 100, and the image sensor 111 may move in the first direction (X-direction) and the second direction (Y-direction) based on an operation of the driver 120, and may rotate about the optical axis (Z-axis) as a rotation axis.

Accordingly, an optical image stabilization function may be performed based on a movement of the image sensor 111.

The camera module in an example embodiment may perform optical image stabilization by moving the image sensor 111 rather than moving the lens module 200. Since the image sensor 111 having a relatively light weight moves, the image sensor 111 may move with smaller driving force. Accordingly, the camera module may have a reduced size.

The lens module 200 may move in the optical axis (Z-axis) direction with respect to the housing 300. Accordingly, a focus may be adjusted by moving the lens module 200 in the optical axis (Z-axis) direction.

The focus adjustment driver may include a magnet 210 and a coil 230 that create a driving force in the optical axis (Z-axis) direction, the magnet 210 may be attached to the lens module 200, and the coil 230 may be mounted on the housing 300 to oppose the magnet 210. A substrate for applying power to the coil 230 may be disposed in the housing 300. The coil 230 may be disposed on one surface of the substrate.

When power is applied to the coil 230, the lens module 200 may move in the optical axis (Z-axis) direction by electromagnetic force between the magnet 210 and the coil 230.

When the lens module 200 moves, the ball member B may be disposed between the lens module 200 and the housing 300 to reduce friction between the lens module 200 and the housing 300. The ball member B may include a plurality of balls.

A guide groove portion for accommodating the ball member B may be formed on at least one of the surfaces of the lens module 200 and the housing 300 opposing each other in a direction perpendicular to the optical axis (Z-axis).

The ball member B may be accommodated in the guide groove portion and may be inserted to a region between the lens module 200 and the housing 300.

The yoke may be disposed to oppose the magnet 210 in a direction perpendicular to the optical axis (Z-axis). For example, the yoke may be disposed on the other surface of the substrate or the other surface of the coil 230. Accordingly, the yoke may be disposed to oppose the magnet 210 with the coil 230 interposed therebetween.

An attractive force may act in a direction perpendicular to the optical axis (Z-axis) between the yoke and the magnet 210.

Accordingly, the ball member B may maintain a contact state with the lens module 200 and the housing 300 by an attractive force between the yoke and the magnet 210.

A position sensor that opposes the magnet 210 may be disposed on the substrate.

In FIG. 20, the ball member B may be disposed on the opposite side of the magnet 210. However, an example embodiment of the ball member B is not limited thereto, and the ball member B may be disposed in a contact state with the lens module 200, and the housing 300 may be maintained by an attractive force between the magnet 210 and the yoke.

Figure 21:
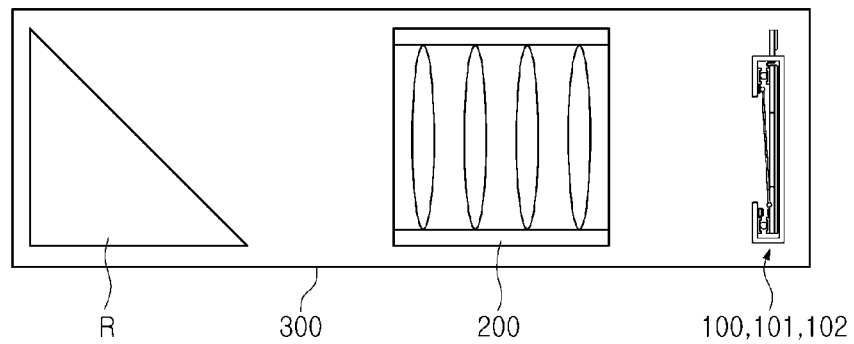
FIG. 21 is a cross-sectional diagram illustrating an example camera module, in accordance with one or more embodiments.

FIG. 21 is a cross-sectional diagram illustrating a camera module 20, in accordance with one or more embodiments.

Referring to FIG. 21, the camera module 20, in an example, may include a housing 300, a reflective module R, a lens module 200 and a sensor actuator 100.

In the example embodiment, the optical axis (Z-axis) of the lens module 200 may be directed to a direction perpendicular to the thickness direction (a direction from a front surface to a rear surface of the portable electronic device or vice versa) of the portable electronic device.

In an example, the optical axis (Z-axis) of the lens module 200 may be formed in the width direction or the length direction of the portable electronic device.

When the components included in the camera module are stacked in the thickness direction of the portable electronic device, the thickness of the portable electronic device may increase.

However, in the camera module 20 in the example embodiment, since the optical axis (Z-axis) of the lens module 200 is formed in the width direction or the length direction of the portable electronic device, the thickness of the portable electronic device may be reduced.

In the housing 300, the reflective module R and the lens module 200 may be disposed. Alternatively, the reflective module R and the lens module 200 may be disposed in different housings, and the housings may be combined with each other.

The reflective module R may be configured to change a traveling direction of light. For example, a direction of light incident into the housing 300 may change to be directed toward the lens module 200 through the reflective module R. The reflective module R may be a mirror or a prism that reflects light.

The sensor actuator 100 may be coupled to the housing 300.

The sensor actuator 100 may be the sensor actuator 100 described in the aforementioned example embodiment.

An image sensor 111 may be disposed in the sensor actuator 100, and the image sensor 111 may move in a first direction (X-direction) and a second direction (Y-direction), or may rotate about an optical axis (Z-axis) as a rotation axis.

Accordingly, an optical image stabilization function may be performed based on a movement of the image sensor 111.

The lens module 200 may move in the optical axis (Z-axis) direction with respect to the housing 300. Accordingly, a focus may be adjusted by moving the lens module 200 in the optical axis (Z-axis) direction.

Since the configuration of the driver for focus adjustment is the same as the configuration of the focusing driver described with reference to FIG. 20, a detailed description thereof will not be provided.

According to the aforementioned example embodiments, a sensor actuator and a camera module including the same may improve optical image stabilization performance.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor actuator, comprising:
a movable body on which an image sensor having an imaging plane is disposed;
a fixed body, configured to accommodate the movable body; and
a driver, configured to provide a driving force to move the image sensor,
wherein the driver comprises a plurality of wires which have lengths that vary to provide the driving force when power is applied to each of the plurality of wires,
wherein each of the plurality of wires is configured to have a first end coupled to the fixed body and a second end coupled to the movable body,
wherein one of the first end and the second end of each of the plurality of wires is connected to the fixed body or the movable body through an elastic portion,
wherein the plurality of wires comprise a first wire portion, a second wire portion, a third wire portion, and a fourth wire portion,
wherein each of the first wire portion to the fourth wire portion comprise two wires, and
wherein each of the first wire portion to the fourth wire portion is configured to have the first end fixed to the fixed body and the second end fixed to the movable body.

2. The sensor actuator of claim 1,
wherein the fixed body comprises a first support plate, and the movable body comprises a second support plate, and
wherein the elastic portion is disposed on one of the first support plate and the second support plate.

3. The sensor actuator of claim 1,
wherein each of the first wire portion and the second wire portion is configured to provide a driving force to move the movable body in a first direction parallel to the imaging plane, and
wherein a moving direction of the movable body based on an operation of the first wire portion and a moving direction of the movable body based on an operation of the second wire portion are opposite to each other.

4. The sensor actuator of claim 3,
wherein a length of one of the first wire portion and the second wire portion is reduced when power is applied to the one of the first wire portion and the second wire portion, and
wherein the elastic portion connected to wire portions other than the one of the first wire portion and the second wire portion is elastically deformed.

5. The sensor actuator of claim 3,
wherein each of the third wire portion and the fourth wire portion is configured to provide a driving force to move the movable body in a second direction parallel to the imaging plane, and
wherein a moving direction of the movable body based on an operation of the third wire portion and a moving direction of the movable body based on an operation of the fourth wire portion are opposite to each other.

6. The sensor actuator of claim 5,
wherein a length of one of the third wire portion and the fourth wire portion is reduced when power is applied to the one of the third wire portion and the fourth wire portion, and
wherein the elastic portion connected to wire portions other than the one of the third wire portion and the fourth wire portion is elastically deformed.

7. The sensor actuator of claim 5, wherein the movable body is configured to rotate by at least two wires which are configured to generate driving forces in opposite directions.

8. The sensor actuator of claim 1,
wherein each of the first wire portion and the second wire portion is configured to provide a driving force to move the movable body in a first direction parallel to the imaging plane,
wherein the two wires of the first wire portion and the two wires of the second wire portion are spaced apart from each other in a second direction parallel to the imaging plane, and
wherein the first direction and the second direction are perpendicular to each other.

9. The sensor actuator of claim 8,
wherein each of the third wire portion and the fourth wire portion are configured to provide a driving force to move the movable body in the second direction, respectively, and
wherein the two wires of the third wire portion and the two wires of the fourth wire portion are spaced apart from each other in the first direction.

10. The sensor actuator of claim 1, wherein a ball member, configured
to support movement of the movable body, is disposed between the movable body and
the fixed body.

11. The sensor actuator of claim 1, further comprising:
a support substrate configured to support the movable body such that the movable body moves,
wherein the support substrate comprises a deformable portion that is elastically deformed as the movable body moves.

12. The sensor actuator of claim 11,
wherein the support substrate further comprises a movable portion on which the movable body is disposed, and a fixed portion coupled to the fixed body, and
wherein the elastic portion elastically connects the movable portion to the fixed portion.

13. The sensor actuator of claim 1, further comprising:
a position sensing portion configured to sense a position of the image sensor, and comprising a sensing coil disposed on one of the movable body and the fixed body, and a sensing yoke portion disposed on the other of the movable body and the fixed body,
wherein the sensing yoke portion comprises a plurality of sensing yokes spaced apart from each other in a direction parallel to the imaging plane, and
wherein each sensing yoke is configured to have a width that changes in a moving direction of the image sensor.

14. The sensor actuator of claim 13,
wherein the plurality of sensing yokes comprise a first sensing yoke and a second sensing yoke,
wherein each of the first sensing yoke and the second sensing yoke opposes the sensing coil in a direction perpendicular to the imaging plane, and
wherein each of the first sensing yoke and the second sensing yoke has a width that increases and decreases in a moving direction of the image sensor, and positions of the first sensing yoke and the second sensing yoke in which widths increase or decrease have different shapes.

15. A camera module, comprising:
a lens module comprising at least one lens;
a housing configured to accommodate the lens module;
a first driver configured to move the lens module in an optical axis direction;
a fixed body coupled to the housing;
a movable body accommodated in the fixed body and comprising an image sensor disposed therein;
a second driver configured to provide a driving force to move the image sensor in a first direction and a second direction perpendicular to the optical axis direction,
wherein the second driver comprises a plurality of wires which have lengths that vary to provide the driving force when power is applied to each of the plurality of wires,
wherein each of the plurality of wires is configured to have a first end coupled to the fixed body and a second end coupled to the movable body,
wherein one of the first end and the second end of each wire of the plurality of wires is connected to the fixed body or the movable body through an elastic portion,
wherein the plurality of wires comprise a first wire portion, a second wire portion, a third wire portion, and a fourth wire portion,
wherein each of the first wire portion to the fourth wire portion comprise two wires, and
wherein each of the first wire portion to the fourth wire portion is configured to have the first end fixed to the fixed body and the second end fixed to the movable body.

16. An apparatus, comprising:
a camera module, comprising:
a movable body on which an image sensor is disposed;
a fixed body configured to accommodate the movable body;
a driver, configured to provide a driving force to move the image sensor, the driver comprising:
wire portions comprising first ends coupled to the fixed body and second ends coupled to the movable body, and configured to provide a driving force to move the moveable body in first and second directions parallel to an imaging plane of the image sensor, and configured to rotate the movable body about an optical axis;
wherein each of the wire portions has a length that varies to provide the driving force when power is applied to each of the wire portions,
wherein the wire portions comprise a first wire portion, a second wire portion, a third wire portion, and a fourth wire portion,
wherein each of the first wire portion to the fourth wire portion comprise two wires, and
wherein each of the first wire portion to the fourth wire portion is configured to have the first end fixed to the fixed body and the second end fixed to the movable body.

17. The apparatus of claim 16, wherein each of the wire portions is a shape memory alloy.

18. The apparatus of claim 16, wherein the first direction comprises directions that are opposite to each other,
the second direction comprises directions that are opposite to each other, and
the first direction is perpendicular to the second direction.

* * * * *